(12) United States Patent
Greenspan et al.

(10) Patent No.: US 7,683,500 B2
(45) Date of Patent: Mar. 23, 2010

(54) WAVE ENERGY RECOVERY SYSTEM

(76) Inventors: Alexander Greenspan, 6975 Liberty Rd., Solon, OH (US) 44139; Greg Greenspan, 6210 Lochmoor Ct., Solon, OH (US) 44139; Gene Alter, 8075 Azalea Cir., Chagrin Falls, OH (US) 44023

( * ) Notice: Subject to any disclaimer, the term of this patent is extended or adjusted under 35 U.S.C. 154(b) by 0 days.

(21) Appl. No.: 12/313,955

(22) Filed: Nov. 26, 2008

(65) Prior Publication Data
US 2009/0102200 A1   Apr. 23, 2009

Related U.S. Application Data

(63) Continuation of application No. 11/602,145, filed on Nov. 20, 2006, now Pat. No. 7,474,013.

(60) Provisional application No. 60/738,287, filed on Nov. 18, 2005.

(51) Int. Cl.
F03B 13/10   (2006.01)
(52) U.S. Cl. .................................................. 290/53
(58) Field of Classification Search ............. 290/53
See application file for complete search history.

(56) References Cited

U.S. PATENT DOCUMENTS

| | | | |
|---|---|---|---|
| 1,037,041 A | 8/1912 | Olson et al. | |
| 3,567,953 A | 3/1971 | Lord | |
| 3,668,412 A * | 6/1972 | Vrana et al. | 290/53 |
| 3,918,260 A * | 11/1975 | Mahneke | 60/500 |
| 4,052,856 A | 10/1977 | Trotta | |
| 4,145,885 A * | 3/1979 | Solell | 60/504 |
| 4,208,877 A | 6/1980 | Evans et al. | |
| 4,228,360 A * | 10/1980 | Navarro | 290/43 |
| 4,242,593 A * | 12/1980 | Quilico et al. | 290/53 |
| 4,355,511 A * | 10/1982 | Jones | 60/507 |
| 4,691,514 A | 9/1987 | Smith | |
| 5,066,867 A | 11/1991 | Shim | |
| 5,359,229 A * | 10/1994 | Youngblood | 290/53 |
| 5,424,582 A | 6/1995 | Trepl, II et al. | |
| 5,786,645 A | 7/1998 | Obidniak | |

(Continued)

FOREIGN PATENT DOCUMENTS

| | | |
|---|---|---|
| DE | 3913755 A1 * | 10/1990 |
| GB | 2089438 | 6/1982 |
| GB | 2192671 | 1/1988 |
| GB | 2241990 | 9/1991 |
| JP | 56-092365 | 7/1981 |
| JP | 03-168363 | 7/1991 |

(Continued)

OTHER PUBLICATIONS

International Search Rpt., Dec. 5, 2007, Orbital Industries, Inc.
Written Opinion, Dec. 5, 2007, Orbital Industries, Inc.

*Primary Examiner*—Joseph Waks
(74) *Attorney, Agent, or Firm*—McDonald Hopkins LLC

(57) ABSTRACT

A novel apparatus and methods for recovering energy from water waves is provided. An embodiment of the present invention includes a buoy, a shaft, and an electric power generating device. The shaft is coupled to the buoy such that when the buoy moves vertically in response to a passing wave, the shaft rotates. The shaft is coupled to the electric power generating device such that when the shaft rotates, the generating device produces electric power. Once electric power is generated, it is delivered to shore, where it is stored, used to power a device, or delivered to a power distribution grid.

20 Claims, 15 Drawing Sheets

U.S. PATENT DOCUMENTS

| | | |
|---|---|---|
| 5,808,368 A | 9/1998 | Brown |
| 5,842,838 A * | 12/1998 | Berg .......................... 417/331 |
| 6,020,653 A | 2/2000 | Woodbridge et al. |
| 6,140,712 A | 10/2000 | Fredriksson et al. |
| 6,392,314 B1 | 5/2002 | Dick |
| 6,711,897 B2 * | 3/2004 | Lee ............................. 60/507 |
| 7,045,912 B2 * | 5/2006 | Leijon et al. .................. 290/42 |
| 7,319,278 B2 * | 1/2008 | Gehring ....................... 290/53 |
| 7,474,013 B2 | 1/2009 | Greenspan et al. |
| 2004/0251692 A1 | 12/2004 | Leijon et al. |
| 2005/0121915 A1 | 6/2005 | Leijon et al. |

FOREIGN PATENT DOCUMENTS

| | | |
|---|---|---|
| JP | 04-008870 | 1/1992 |
| JP | 2001095424 A * | 4/2001 |
| SU | 844468 B * | 7/1981 |
| SU | 1268789 A * | 11/1986 |

* cited by examiner

WAVE ENERGY RECOVERY SYSTEM

CROSS-REFERENCE TO RELATED APPLICATION

This application is a continuation of U.S. patent application Ser. No. 11/602,145 to Greenspan et al. filed on Nov. 20, 2006 now U.S. Pat. No. 7,474,013, and titled WAVE ENERGY RECOVERY SYSTEM, which claims priority from U.S. Provisional Patent Application No. 60/738,287 to Greenspan et al. filed on Nov. 18, 2005, and titled WAVE ENERGY RECOVERY SYSTEM, both of which are hereby incorporated in their entirety by reference.

FIELD OF INVENTION

The present invention relates generally to systems for recovering energy from waves and, more particularly, the present invention relates to apparatus and methods for transforming vertical displacement of buoys caused by waves into rotational motion to drive the generation of electric power.

BACKGROUND

Currently, approximately 350 million megawatt-hours of energy are consumed globally each day (which is equivalent to the energy in approximately 205 million barrels of oil). With continued industrial expansion and population growth throughout the developed and developing world, global consumption is expected to increase approximately sixty percent over the next twenty-five years, pushing global energy consumption to over 500 million megawatt-hours per day. Approximately seventy-five percent of energy currently consumed comes from non-renewable sources, such as oil, coal, natural gas, and other such fossil fuels. The current level of fossil fuel usage accounts for the release of approximately six million tons of carbon dioxide into the atmosphere each day. With a finite supply of fossil fuels available and growing concerns over the impact of carbon dioxide, continued reliance on fossil fuels as a primary source of energy is not indefinitely sustainable.

One approach to sustaining the current global energy consumption rate and accounting for future increases in consumption is to research and develop novel and improved methods for generating energy from renewable sources. Sources of renewable energy include water-powered energy, wind-powered energy, solar energy, and geothermal energy. Of the current practical renewable energy sources, water-powered energy, and specifically wave-powered energy, may hold the most promise for developing a substantial renewable energy source to meet growing global energy needs.

It has been long understood that ocean waves contain considerable amounts of energy. Given the high level of energy concentration present in waves and the vast areas available for harvesting such energy, wave-powered energy technology represents a significant renewable energy source. Numerous systems have been developed in an attempt to efficiently capture the energy of waves; however, no prior conceived systems or methods have achieved the efficiency or cost-effectiveness required to make wave-powered energy a viable alternative energy source.

Wave energy recovery systems must successfully operate in very hostile marine or freshwater environments. Such environments are prone to violent storms and the deleterious impact of salt water, plant life, and animal life. Further, due to the offshore location of such systems, a successful system must include an efficient means for delivering the energy output to shore. These and other technical challenges have been addressed and overcome by this invention as herein described.

SUMMARY OF INVENTION

The present invention includes novel apparatus and methods for recovering energy from water waves. An embodiment of the present invention includes a buoy, a shaft, and an electric power generating device. The shaft is coupled to the buoy such that when the buoy moves vertically in response to a passing wave, the shaft rotates. The shaft is coupled to the electric power generating device such that when the shaft rotates, the electric power generating device produces electric power. Once electric power is generated, it is delivered to shore, where it is stored, used to power a device, or delivered to a power distribution grid.

DESCRIPTION OF DRAWINGS

Objects and advantages together with the operation of the invention may be better understood by reference to the following detailed description taken in connection with the following illustrations, wherein.

DETAILED DESCRIPTION OF THE PREFERRED EMBODIMENT

While the present invention is disclosed with reference to the embodiments described herein, it should be clear that the present invention should not be limited to such embodiments. Therefore, the description of the embodiments herein is only illustrative of the present invention and should not limit the scope of the invention as claimed.

A wave energy recovery system, as described herein, converts the energy of sea waves or other such water waves into usable mechanical and electrical energy. Apparatus and methods may be arranged such that the vertical pulse motion of waves of any magnitude and frequency may be converted to other types of motion such as, for example, rotating motion. The mechanical energy of this resulting rotating motion may be arranged to drive gearboxes, motors, pumps, generators, or the like to generate electricity.

In an embodiment of the present invention, the vertical pulse motion of a wave is translated to a buoy floating at or near the surface of a body of water to vertically displace the buoy. The vertical displacement of the buoy is translated to rotational motion, which is engaged to a pulley and ratchet mechanism to drive an alternating current (AC) permanent magnet generator, resulting in the generation of electric power. A gearbox may be used to convert relatively low revolutions per minute (RPMs) rotating speed into a rotating speed desired to drive the generator. Preferably, a gearbox utilizes a planetary gear set; however, other gear sets could be utilized. The AC permanent magnet generator is coupled to a rectifier to convert the alternating current (AC) produced by the generator to a direct current (DC). The rectifier is coupled to a voltage converter to generate a consistent DC current to be used as a final source of electricity or to be converted back to AC current and delivered to a power generation grid. As used herein, the term "coupled" means directly or indirectly connected in a mechanical, electrical, or other such manner.

Figure 1:
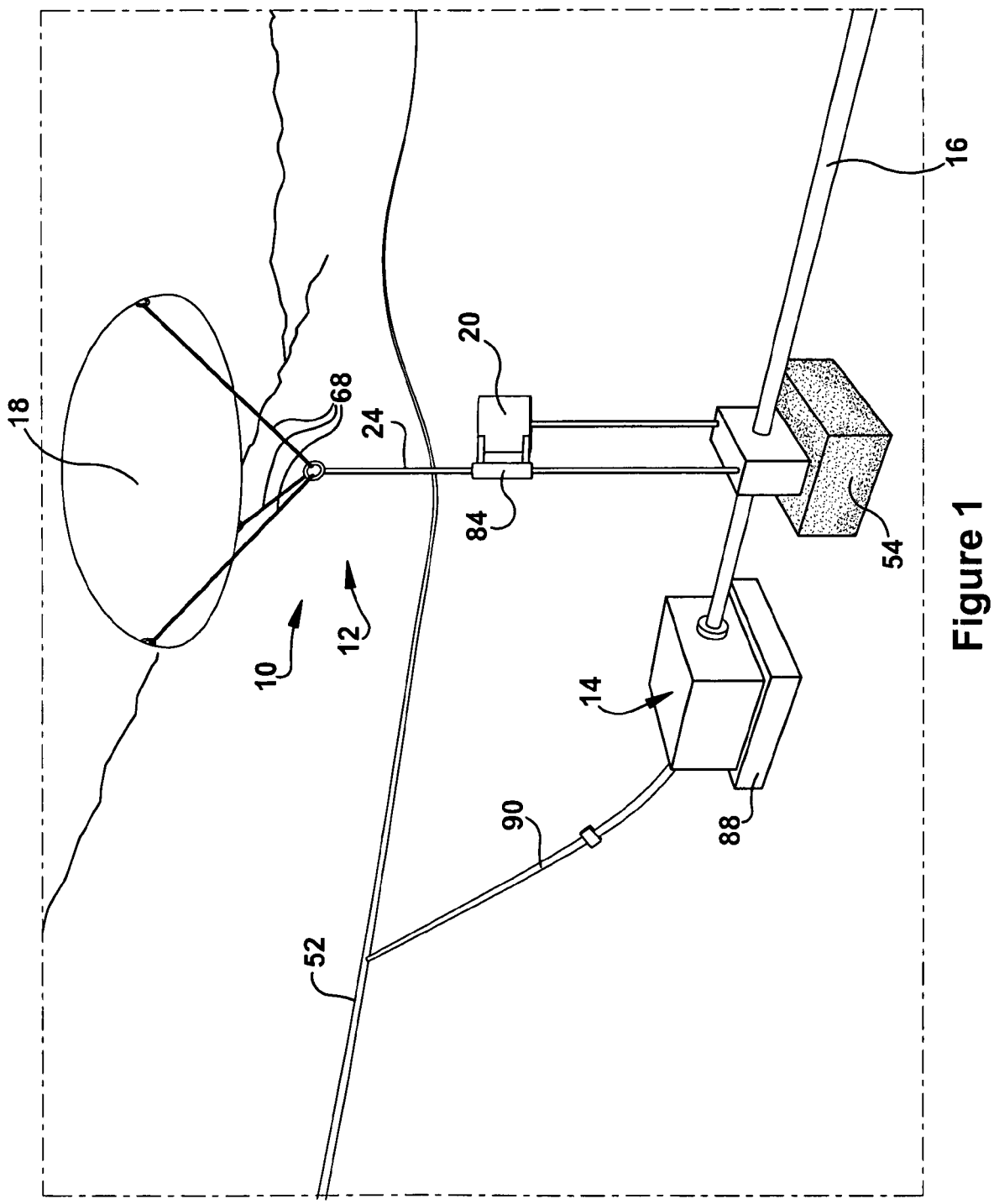
FIG. 1 is a perspective view of an embodiment of a wave energy recovery system in accordance with the present invention.
Figure 2:
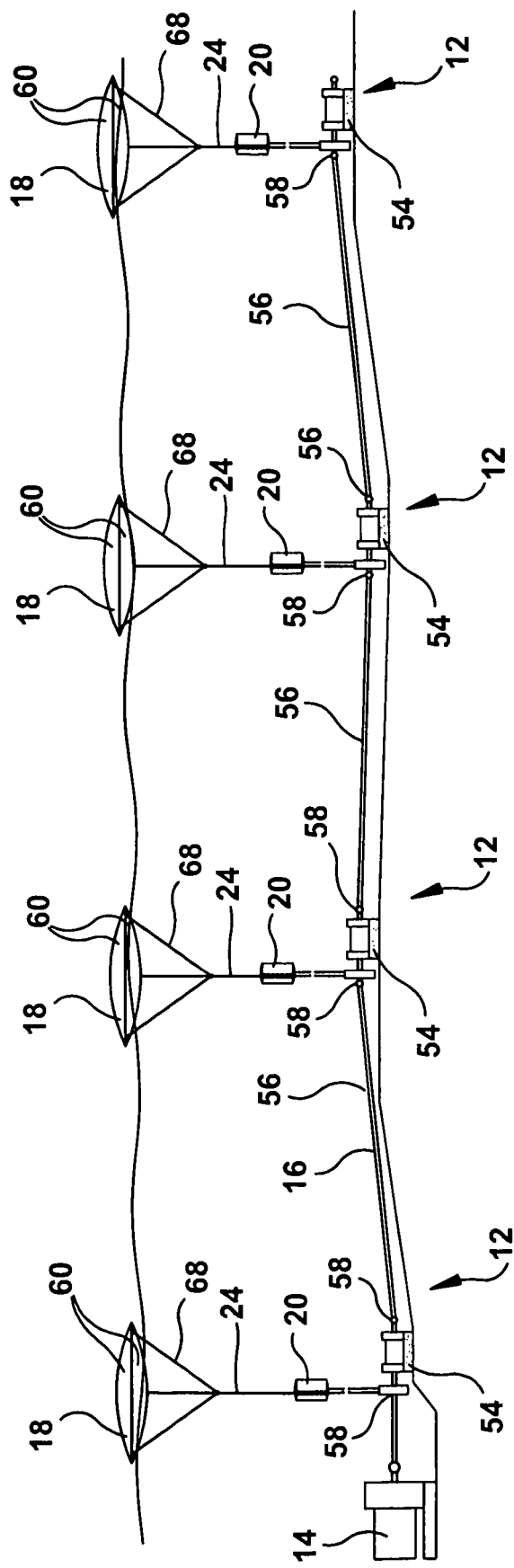
FIG. 2 is a schematic illustration of the wave energy recovery system of FIG. 1.

An exemplary embodiment of the present invention is illustrated in FIGS. 1 through 6. FIG. 1 illustrates a perspective view of a wave energy recovery system 10. The system 10 comprises a motion translating assembly 12, a generator 14, and a shaft 16. The system 10 is positioned on a seabed relatively close to shore and arranged to generate electric power, delivering that electric power to shore. As will be further described above, the motion translating assembly 12 translates the vertical pulse motion of a wave to rotational motion of the shaft 16, and such rotational motion of the shaft 16 drives the generator 14. The generator 14 is preferably an AC permanent magnet generator. As shown in FIG. 2, a plurality of motion translating assemblies 12 may be arranged in series to assist in rotating the shaft 16 to drive the generator 14.

Figure 3:
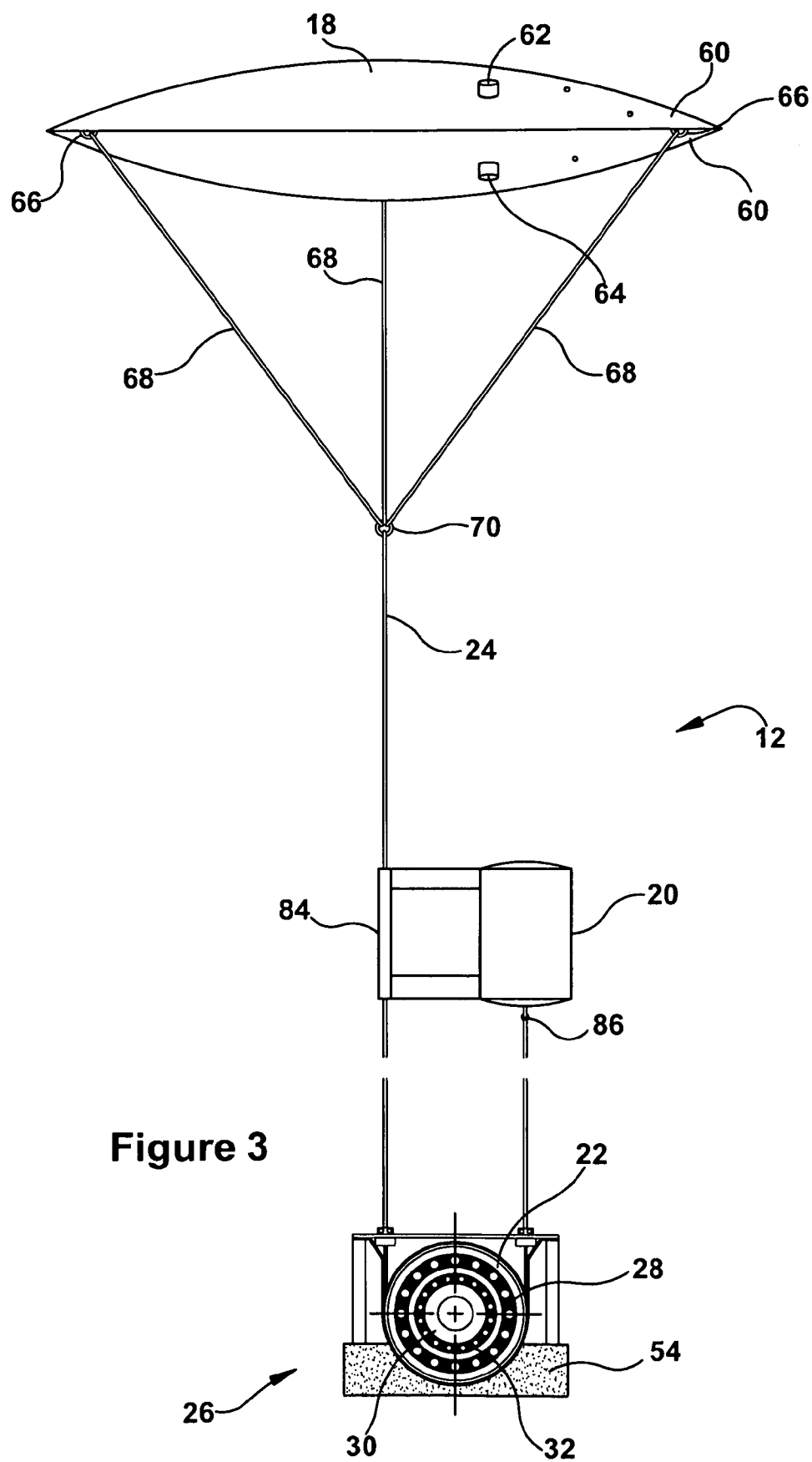
FIG. 3 is a schematic illustration of a motion translating assembly of the wave energy recovery system of FIG. 1.

As best seen in FIG. 3, a motion translating assembly 12 includes a main buoy or float 18, a retracting buoy or float 20, an oscillating pulley 22, a main cable 24, and a ratchet mechanism 26. The main cable 24 is coupled on one end to the main buoy 18, coupled on the other end to the retracting buoy 20, and wrapped around the pulley 22. The buoys 18 and 20 are arranged such that, as a wave engages the main buoy 18, the main buoy 18 is displaced vertically upward (i.e., rises relative to the seabed) and the cable 24 rotates the pulley 22 in a clockwise rotation with respect to FIG. 3. As the wave passes the main buoy 18, the main buoy 18 is displaced vertically downward (i.e., falls relative to the seabed), the retracting buoy 24 rises to remove any slack from the cable 24, and the pulley 22 rotates counterclockwise with respect to FIG. 3. Thus, as waves pass the main buoy 18, vertical displacement of the main buoy 18 by a passing wave is transformed into rotational motion of the oscillating pulley 22. Although the main cable 24 is described as coupled to the main buoy 18 and the retracting buoy 20 and wrapped around the pulley 22, it will be readily understood by those skilled in the art that any number of arrangements may convert vertical motion of the main buoy 18 to rotational motion. For example, a first cable may be coupled on one end to the main buoy 18 and coupled on the other end to the pulley 22. A second cable may be coupled to the retracting buoy 20 on a first end and coupled on the other end to the pulley 22. In such an arrangement, the first and second cables effectively replace one main cable 24 to rotate the oscillating pulley 22 as the main buoy 18 moves vertically.

Figure 4A:
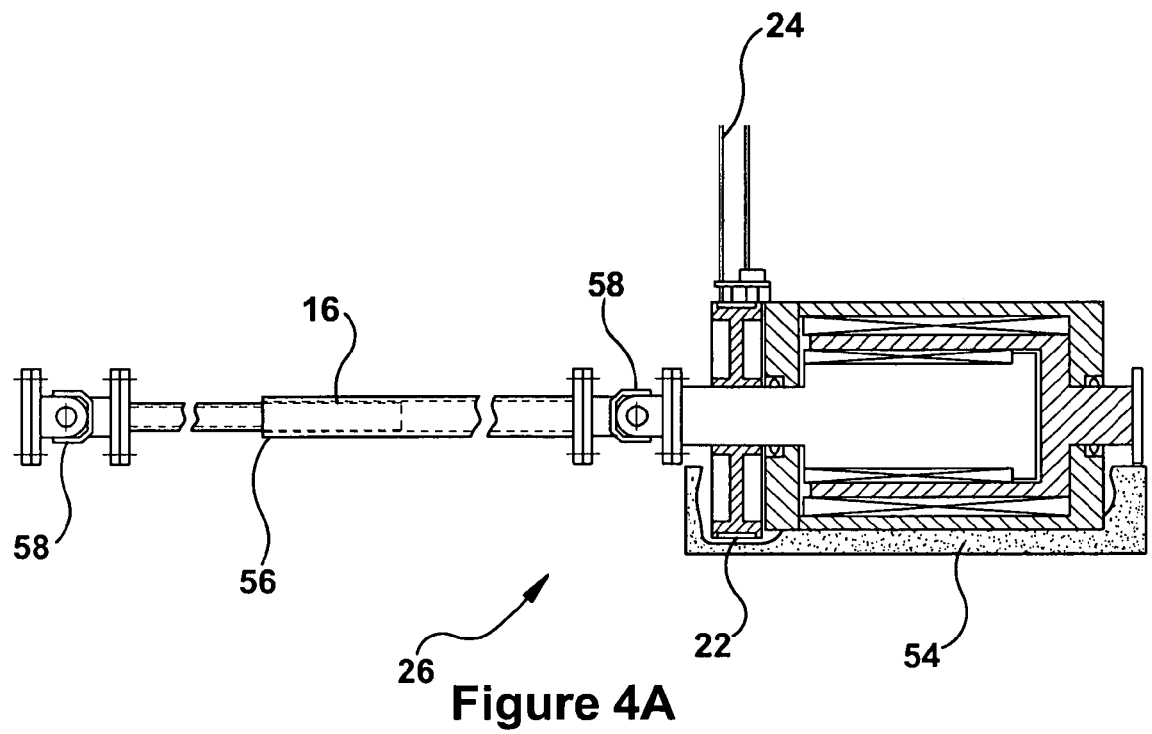
FIGS. 4A and 4B are cross-sectional views of a pulley and ratchet mechanism of the wave energy recovery system of FIG. 1.
Figure 4B:
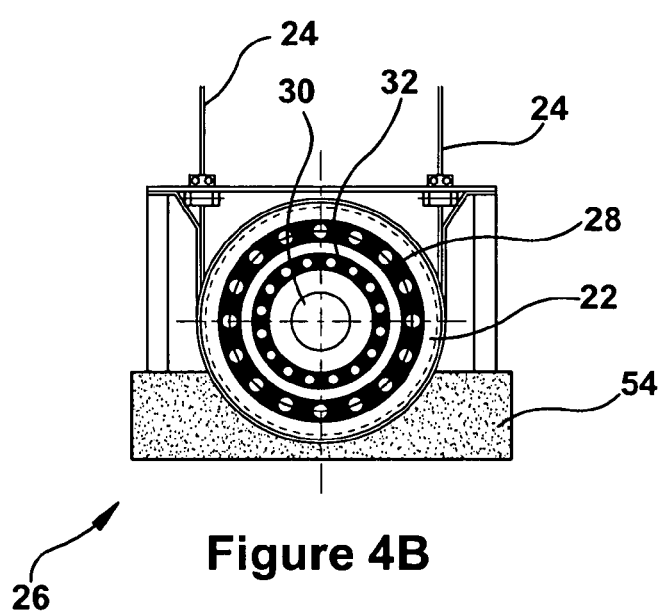

As best seen in FIGS. 4A and 4B, the oscillating pulley 22 is coupled to the ratchet mechanism 26 such that rotational motion is transferred from the pulley 22 to the ratchet mechanism 26. Preferably, the pulley 22 and ratchet mechanism 26 are constructed from stainless steel. The internal mechanism of the ratchet mechanism 26 consists of three major components: an outer ring 28, an inner ring 30, and roller cams 32. The outer ring 28 is attached to the pulley 22 such that the outer ring 28 rotates as the pulley 22 rotates. The inner ring 30 is attached to the shaft 16 such that the shaft 16 rotates as the inner ring 30 rotates. The ratchet mechanism 26 functions as a one-way ratchet; therefore, the rotation of the pulley 22 is only translated through the ratchet mechanism 26 to the shaft 16 when the pulley 22 rotates in one direction. For example, with reference to FIG. 3, the rotation of the pulley 22 is only translated to the shaft 16 when the main buoy 18 is raised by a passing wave and the pulley 22 rotates clockwise. When the wave moves past the main buoy 18 and the buoy 18 falls, the counterclockwise rotation of the pulley 22 is not translated to the shaft 16. This arrangement insures that the shaft 16 rotates in only one direction as it drives the generator 14.

Figure 5A:
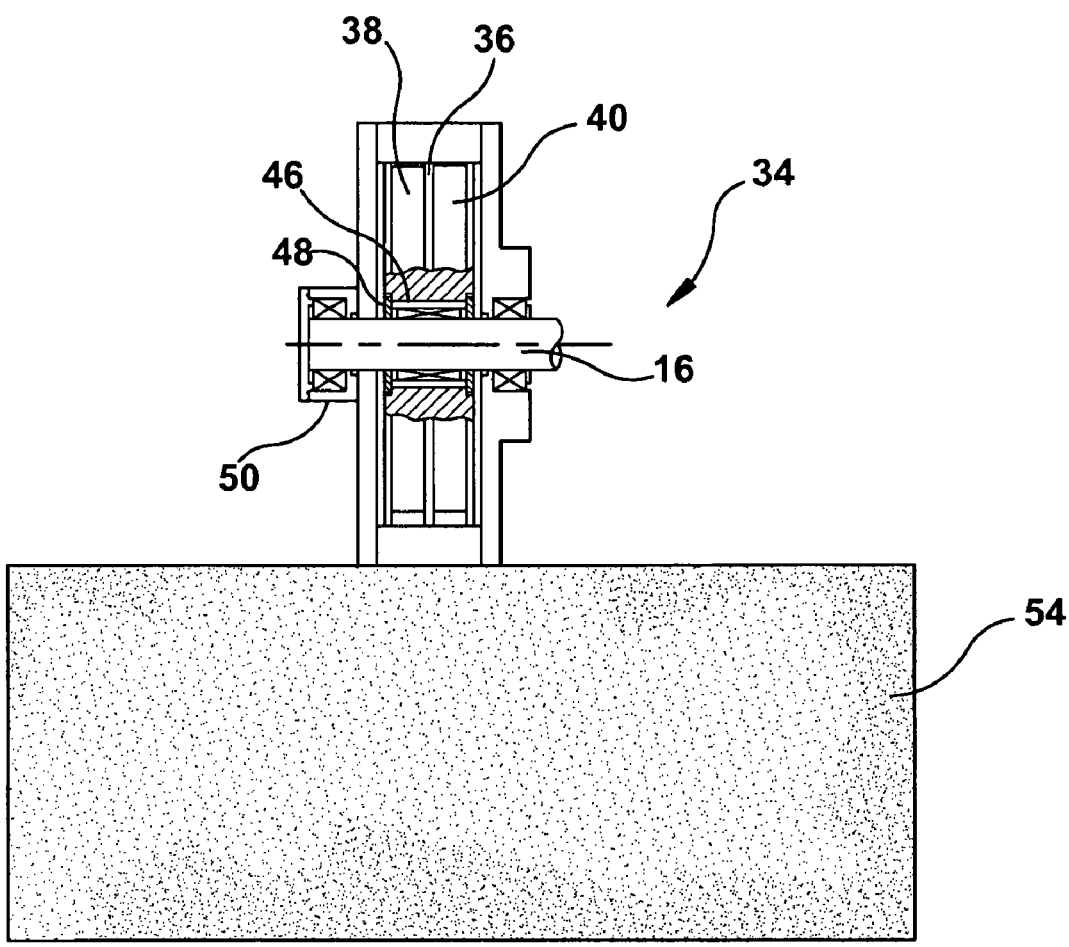
FIGS. 5A and 5B are cross-sectional views of another pulley and ratchet mechanism of the wave energy recovery system of FIG. 1.
Figure 5B:
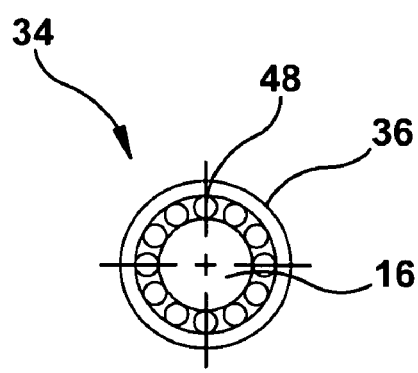
Figures 8A, 8B:
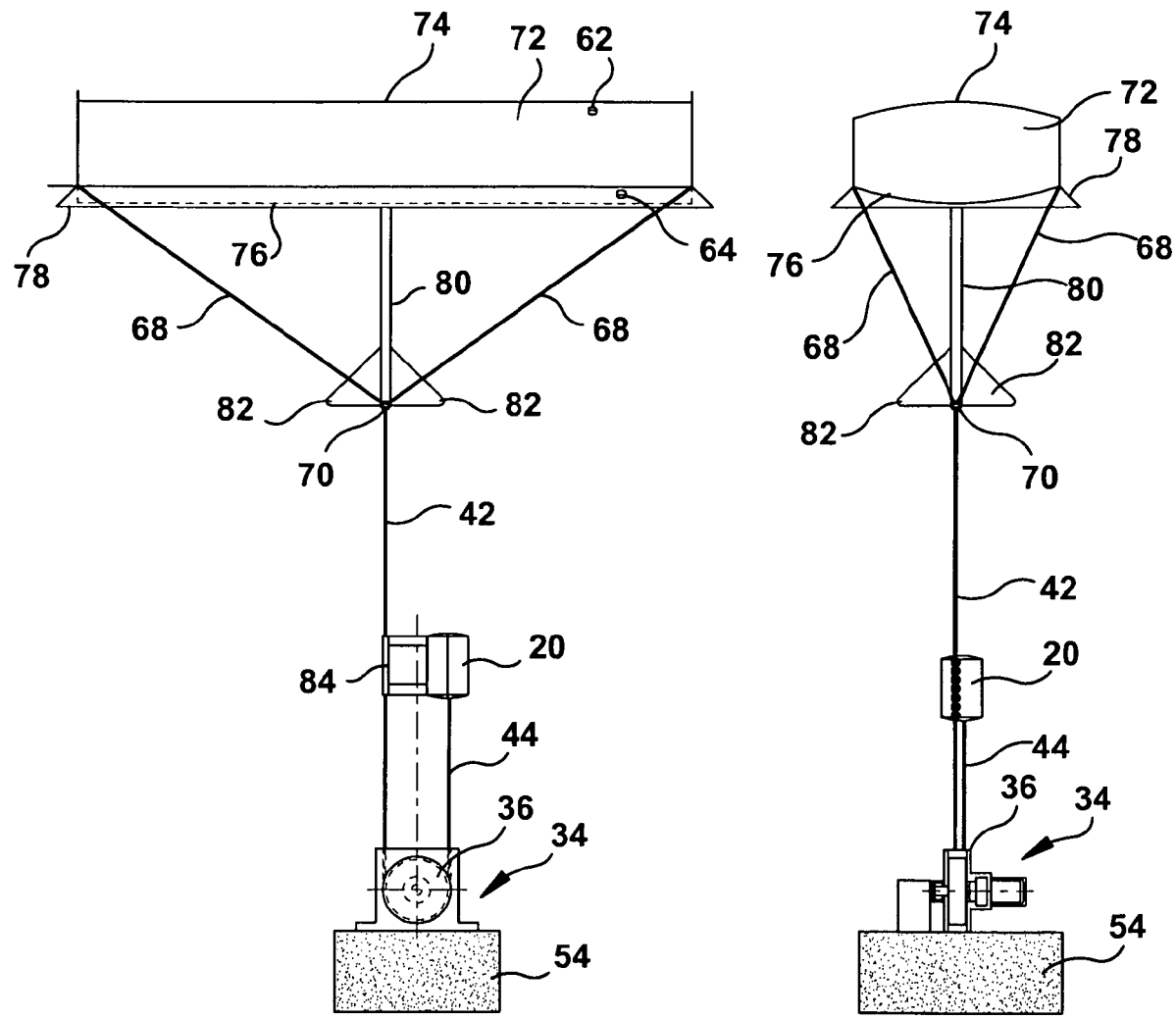
FIGS. 8A and 8B are views of a motion translating assembly in accordance with the present invention.

One alternative ratchet mechanisms 34 to the ratchet mechanism 26 described above and illustrated in FIGS. 4A and 4B is illustrated in FIGS. 5A and 5B. In this alternative embodiment, a pulley 36 includes a first groove 38 and a second groove 40. A main buoy cable 42 is attached to the pulley 36 on a first end, attached to the main buoy 18 on second end, and wound around the first groove 38 (as seen in FIG. 8A). A retraction buoy cable 44 is attached to the pulley 36 on a first end, attached to the retraction buoy 20 on second end, and wound around the second groove 40 in a manner opposite of the wind of the main buoy cable 42 (see FIG. 8A). As will be readily understood by those skilled in the art, in such an arrangement, the pulley 36 rotates in a first direction when the main buoy 18 moves upward and the retraction buoy 20 moves downward, and the pulley 36 rotates in a second and opposite direction when the main buoy 18 moves downward and the retraction buoy 20 moves upward. The shaft 16 passes through an aperture through the center of the pulley 36, and a plurality of eccentric rollers 46 are positioned between the pulley 36 and the shaft 16. Similar to the description above, the ratchet mechanism 34 translates rotational motion from the pulley 36 to the shaft 16 when the pulley rotates in the first direction but does not translate rotational motion from the pulley 36 to the shaft 16 when the pulley 36 is rotated in the second direction.

Whether rotational motion is transferred from the pulley 36 is controlled by the eccentric nature and positioning of the rollers 46. The rollers 46 are slightly elliptical and positioned such that, when the pulley 36 is rotated in the first direction, the rollers 46 are engaged with both the shaft 16 and the pulley 36, thus mechanically transferring motion from the pulley 36 to the shaft 16. When the pulley 36 is rotated in the second direction, the rollers 46 rotate slightly to create a gap between the rollers 46 and the pulley 36, thus allowing the pulley 36 to slip with respect to the shaft 16. Seals 48 may be utilized to prevent water from flowing into contact with the rollers 36, which may optionally be lubricated. In addition, a housing 50 may be utilized to enclose the pulley 38 and ratchet mechanism 34 and to provide bearing surfaces for the shaft 16.

As aforementioned and illustrated in FIG. 2, a plurality of motion translating assemblies 12 are coupled to the shaft 16 to drive the generator 14, which is located at an end of the system 10 that is closest to shore. In such an arrangement, it is preferable that the shaft 16 only rotates in one direction. As multiple motion translating assemblies 12 assist in rotating the shaft 16, limiting the shaft 16 to only one direction of rotation allows the assemblies 12 to cooperate in driving the generator 14.

Figure 6:
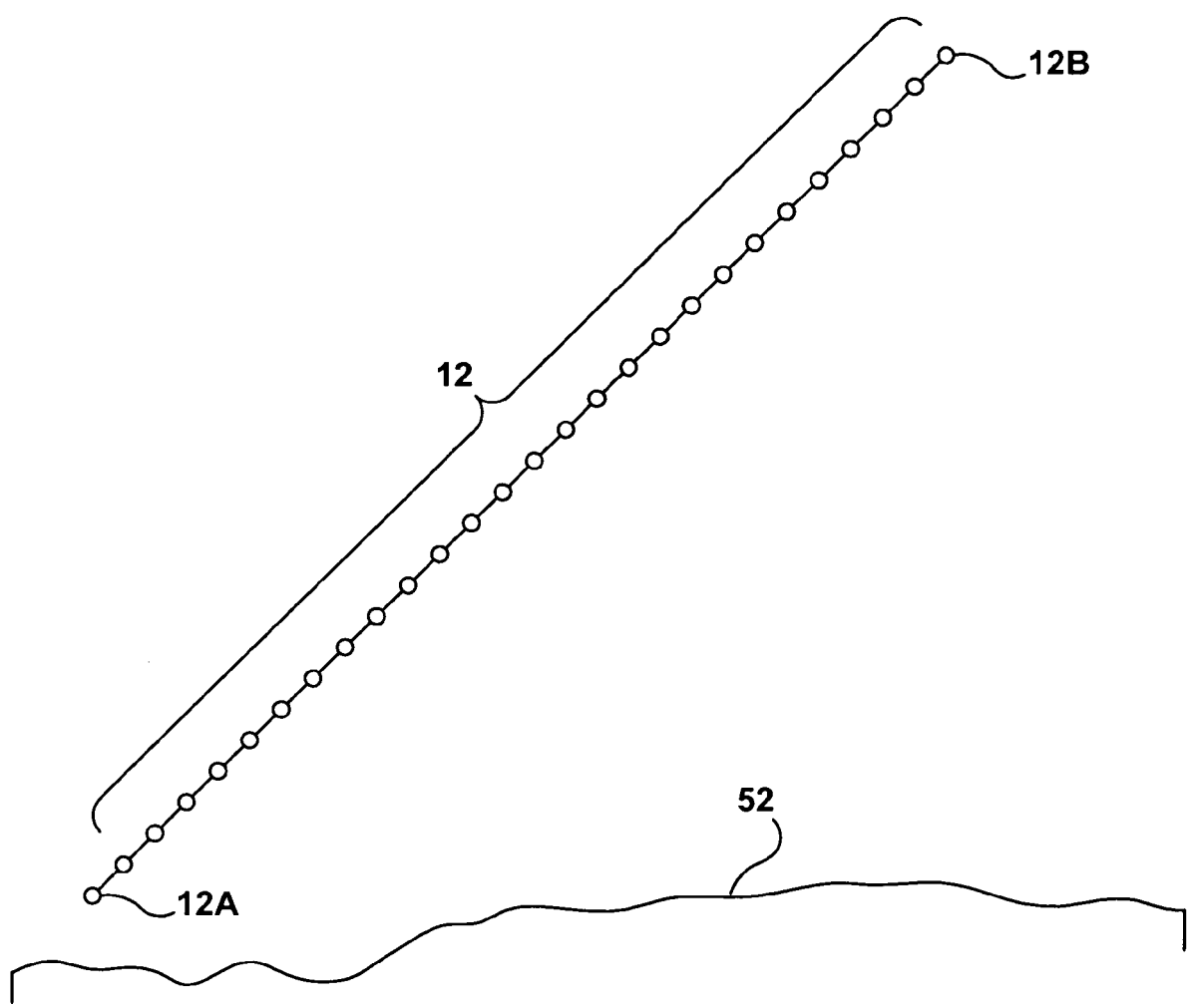
FIG. 6 is a schematic illustration of the wave energy recovery system of FIG. 1.

In an embodiment of the present invention, as shown schematically in FIG. 6, a plurality of motion translating assemblies 12 extend diagonally from the shoreline 52 at approximately a 45 degree angle. Preferably, the system 10 includes approximately thirty motion translating assemblies 12. The assemblies 12 are spaced approximately 30 feet apart, with the assembly 12A closest to the shoreline 52 approximately 500 feet off shore, and the assembly 12B farthest way from the shoreline 52 approximately 3000 feet off shore. Such an arrangement generally results in each incoming wave raising and lowering each main buoy 18 at a different point in time. As a wave progresses towards the shoreline 52, it first encounters the assembly 12B farthest off shore and raises and then lowers that assembly's 12B main buoy 18. Over time, the wave progresses through the plurality of assemblies 12 until it reaches the assembly 12A closest to the shore. Such an arrangement insures that any single wave will not raise and lower the plurality of main buoys 18 at the same point in time, but will raise the plurality of main buoys 18 over a period of time. The raising of main buoys 18 over time as the wave progresses towards the shoreline 52 causes different motion translating assemblies 12 to rotate the shaft 16 at different times, resulting in constant rotation of the shaft 16 at a generally constant speed. Preferably, the arrangement of assemblies 12 is such that at least five of the approximately thirty assemblies 12 are actively rotating the shaft 16 at any point in time.

An arrangement that results in a constantly rotating shaft 16, rotating at a generally constant speed, is a desirable method for driving a generator 14. A gearbox optionally may be used to couple the shaft 16 to the generator 14. The gearbox may manipulate the rotation speed of the shaft 16 to convert the rotational input into the generator 14 to an optimal rotation speed for the generator 14. For example, if the plurality of motion translating assemblies 12 rotates the shaft 16 at a relatively low speed, the gearbox may increase the rotation speed to provide a higher and more efficient rotation speed to the generator 14.

The generator 14 has been described and illustrated as located at the end of the system 10 that is closest to the shore. It will be readily understood by those skilled in the art that the generator 14 is not limited to such positioning. For example, the generator 14 may be located at an end of the system 10 farthest away from the shore; two generators 14 may be used, with one generator 14 located at the far end and the other generator 14 located at the near end; or a generator 14 may be located in the middle of the system 10, between two motion translating assemblies 12. Positioning the generator 14 on the seabed surrounds the generator with water, which cools the generator 14 as it generates electric power. As generators 14 typically give off heat, providing a readily available method of cooling the generator 14 increases the efficiency of the generator 14.

Each motion translating assembly 12 is secured to a support platform 54 to maintain a static position with respect to the seabed. In an exemplary embodiment, the support platform 54 is a concrete slab with vertical pillars. The concrete slab 54 has enough mass to maintain its position on the seabed and resist movement due to tides, thrust from the main buoy 18, storms, or other inclement weather. The concrete slab 54, along with the vertical pillars, supports the pulley 22 or 36, the ratchet mechanism 26 or 34, and the shaft 16. Preferably, the support platform 54 is a rectangular slab of concrete measuring ten feet in width, eight feet in depth, and four feet in height. Such a concrete slab weights approximately twenty-five tons and can withstand substantial forces without moving.

As best seen in FIG. 2, each motion translating assembly 12 is coupled to an adjoining assembly 12 by the shaft 16. The shaft 16 is comprised of a plurality of individual shaft segments 56, which extend from a ratchet mechanism 26 or 34 secured to a support platform 54 to another ratchet mechanism 26 or 34 secured to an adjacent support platform 54. To reduce or eliminate concerns over the unevenness or irregularity of the seabed and precise placement of individual support platforms 54, the shaft segments 56 are coupled to the ratchet assemblies 26 or 34 by constant velocity joints 58 (as best seen in FIG. 4A). The constant velocity joints 58 are preferably constructed from stainless steel and allow orbital deflection through a variety of angles. Such an arrangement allows the plurality of motion translating assemblies 12 to continuously drive the shaft 16 even when unevenness of the seabed causes an assembly 12 to be positioned lower or higher relative to the adjoining assemblies 12.

In an embodiment of the present invention, as best shown in FIG. 3, the main buoy 18 includes two ten-foot diameter opposed spherical dishes 60 fused together at their edges. The dishes 60 are preferably constructed of aluminum. The curved shape of the dishes 60 permits a breaking wave to wash over the top of the buoy 18, thereby exerting a force on both the front of the buoy 18 and on the rear of the buoy 18 to assist in maintaining the buoy 18 in a substantially stationary position. The main buoy 18 is equipped with two remotely operated valves—an air inlet valve 62 and a water inlet valve 64. The valves 62 and 64 are remotely controlled to take in water through the water inlet valve 64 for additional ballast to stabilize the floating position of the buoy 18, or to take in pressurized air through the air inlet valve 62 to expel water and reduce water ballast in the buoy 18. The valves 62 and 64 are arranged such that the buoy 18 may take on enough water ballast to completely submerge the buoy 18. A complete submersion of the buoy 18 may be desirable to reduce or eliminate damage to buoys 18 or other system components when violent storms or other such hazards are present. Once a storm passes, the buoy 18 may take in pressurized air through the air inlet 62 to expel water ballast and return the buoy 18 to its operative position. Furthermore, the main buoy 18 can be adjustably raised or lowered through the intake and expulsion of water ballast to dynamically adjust the buoy 18 position in response to changing wave conditions to maintain optimal operative positioning for the buoy 18.

Referring again to FIG. 3, the buoy 18 may be equipped with three pivoted rings 66 through which the buoy 18 is connected to the main cable 24. Three connector cables 68 may be attached to the pivoted rings 66 on one end and attached to a common ring 70 on the other end. The main cable 24 may be attached to the common ring 70 on one end and wrapped around the oscillating pulley 22 or 36 as previously described. In a preferred embodiment, the main cable 24 and the connector cables 68 are approximately ⅜ inch in diameter, with the connector cables 68 approximately 10 to 15 feet in length and the main cable 24 approximately 100 to 200 feet in length.

Figure 7B:
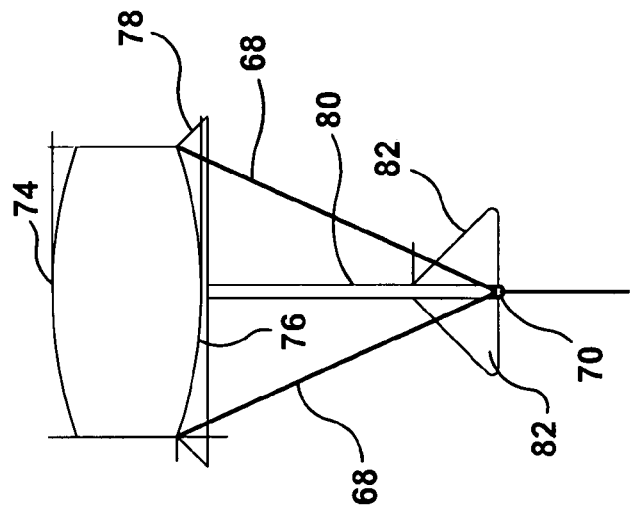
FIGS. 7A, 7B, and 7C are views of an embodiment of a buoy in accordance with the present invention.
Figure 7C:
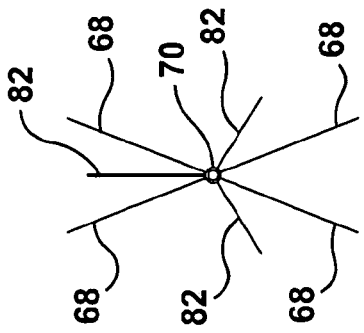
Figure 7A:
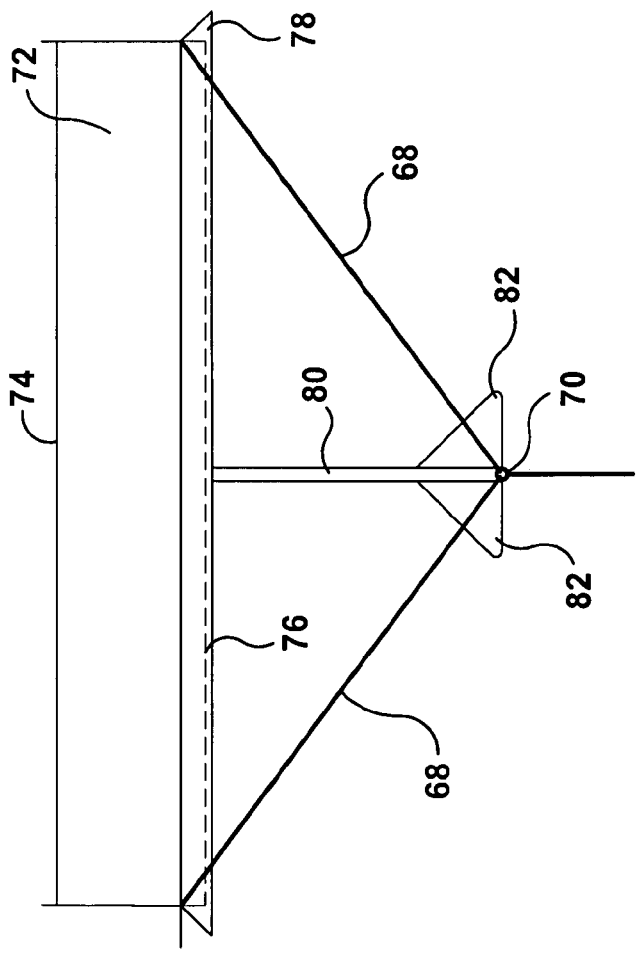

While the shape of a main buoy may be as illustrated in FIG. 3 or any other configuration capable of floating, a preferred embodiment of the main buoy 72 is illustrated in FIGS. 7A, 7B, and 7B. The main buoy 72 includes a generally rectangular body, with the top 74 and bottom 76 surfaces slightly bowed out. A skirt 78 extends from the bottom 76 of the buoy 72, and a rigid member 80, such as a pipe, extends downward from the bottom 76 of the buoy 72, and at least one keel member 82 is attached to the pipe 60. Optionally, multiple keel members 82 may be attached to the pipe 80. Preferably, three keel members 82 are attached to the pipe 80, each 120 degrees apart. The pipe 80 is preferably ten feet in length, and the keel members 82 are triangular shaped and three feet high and three feet wide. As a wave passes the buoy 72 the turbulence in the water is near the surface. Positioning the keel members 82 ten feet below the surface of the water places avoids the turbulence of the wave. Such an arrangement provides stability to the buoy 72 and eliminates or reduces lateral movement, wobbling or rocking of the buoy 72. The elimination of such movement increases the vertical displacement of the buoy 72 and allows recovery of an increased percentage of a wave's energy.

The rectangular shape of the main buoy 72 may produce greater thrust in the motion translating assemblies 12 and produce greater rotational motion of the shaft 16. A rectangular component placed in rough waters has a tendency to turn such that its longer vertical surface faces the incoming waves. By offering a greater surface area to incoming waves, the rectangular buoy 72 catches more of the wave, thereby providing more thrust to the main cable 24 as the buoy 72 is moved upward by a passing wave. Preferably, the rectangular buoy 72 is thirty feet wide, ten feet deep, and five feet high.

The positioning and shape of the skirt 78 also tends to eliminate or reduce lateral movement, wobbling, and rocking of the buoy 72. The shape of the skirt 78, in cooperation with the downward forces produced by the main cable 24 and connector cables 68, holds the buoy 72 level on the surface of the water as a wave passes. As the wave displaces the buoy 72 upward, the buoy 72 remains level, thus reducing or eliminating lateral movement, wobbling, and rocking. As described above, maximizing vertical movement also maximizes the energy recovered from a wave.

Referring again to FIGS. 8A and 8B, the buoy 72 is attached to a pulley 36 in a manner similar to that previously described. Three connector cables 68 connect the buoy 72 to a common ring 70. A main pulley cable 42 connects the common ring 70 to a first groove 38 in the pulley 36. In addition, as described above, the rectangular buoy 72 includes an air inlet valve 62 and a water inlet valve 64 for the intake and expulsion of water ballast to position the buoy 72 to perform optimally or avoid hazards. Preferably, the main buoy 72 is constructed from aluminum; however, the present invention includes buoys constructed of any material that allows the buoy to float and rise and fall as waves pass.

The retracting buoy 20, as best shown in FIGS. 3 and 8A, is preferably constructed from aluminum, is cylindrically shaped, and includes a guide sleeve 84. Similar to the main buoys 18 and 72, the retracting buoy 20 is equipped with a pair of valves—an air inlet valve to intake air and expel water ballast, and a water inlet valve to intake water to increase water ballast. The bottom of the retracting buoy 20 is equipped with a ring 86 that is attached to a main cable 24, which is then wrapped around an oscillating pulley 22 (as seen in FIG. 3). Alternatively, the ring 86 may be attached to a retracting pulley cable 44, which is then attached to an oscillating pulley 36 and wound around a second groove 40 of the pulley 34 (as seen in FIG. 8A).

The guide sleeve 84 is attached to the side of the retracting buoy 20. The guide sleeve 84 is arranged to slide along the cable 24 or 42 to maintain a controlled reciprocating motion that recoils the oscillating pulley 22 or 36 as a wave progresses past the main buoy 18 or 72. In a preferred embodiment, the retracting buoy 20 is approximately 16 inches in diameter and 24 inches in height.

With respect to the cost of building traditional power plants, a wave energy recovery system 10 is very inexpensive to build and install. To install a system 10, components of the system 10 may be loaded onto pontoons or other such floating platforms. The pontoons may be evenly spaced along the surface of the water. The spacing of the pontoons may be approximately equal to the desired operative distance between installed support platforms 54 along the seabed. Pulleys 22 or 36 and ratchet mechanisms 26 or 34 may then be secured to support platforms 54 on the pontoons. These assembled support platforms 54 may be lowered into position on the seabed from the pontoons, using any conventional means, such as chains or cables. The ratcheting mechanisms 26 or 34 may be coupled together by shaft segments 56 and constant velocity joints 58, as previously described. In one alternative, the ratcheting assemblies 26 or 34 may be coupled together with the shaft segments 56 while the support platforms 54 are on the pontoons, and the plurality of support platforms 54 may be lowered together to the seabed.

Once the ratchet assemblies 26 or 34 are coupled together, cables 24 or 42 and 44 are wrapped around each pulley 22 or 36, and a retracting buoy 20 may be attached to one end of the cable and the guide sleeve 64 installed along the cable. The main buoys 18 or 72 may be partially submerged to approximately an operative position by taking in and expelling water ballast using the air and water inlet valves 62 and 64. The free end of the main cable 24 may be attached to the common ring 70 and the length of the main cable 24 properly adjusted. As shown in FIG. 1, the generator 14 may be positioned on the seabed and connected directly to one end of the shaft 16. Such an arrangement translates reciprocating vertical motion from the main buoys 18 or 72 to rotational motion of the shaft 16 coupled to the generator 14. The generator 14 includes a support platform 88 similar to the support platforms 54 of the motion translating assemblies 12. The generator support platform 88 is constructed from concrete and is designed to resist movement due to tides, storms, and other such inclement weather. As will be readily appreciated by those skilled in the art, the rotational motion of the shaft 16 is converted to electric power by the generator 14. A power cord 90 is attached to the generator 14 to deliver the electric power generated to shore. Preferably, the generator 14 is an alternating current (AC) permanent magnet generator. A rectifier is wired to the generator 14 to convert the alternating current to DC current. A voltage converter is coupled to the rectifier to generate a consistent DC current. Such a DC current can be used as a final source of electricity, or the DC current may be converted back to AC current.

Figure 9:
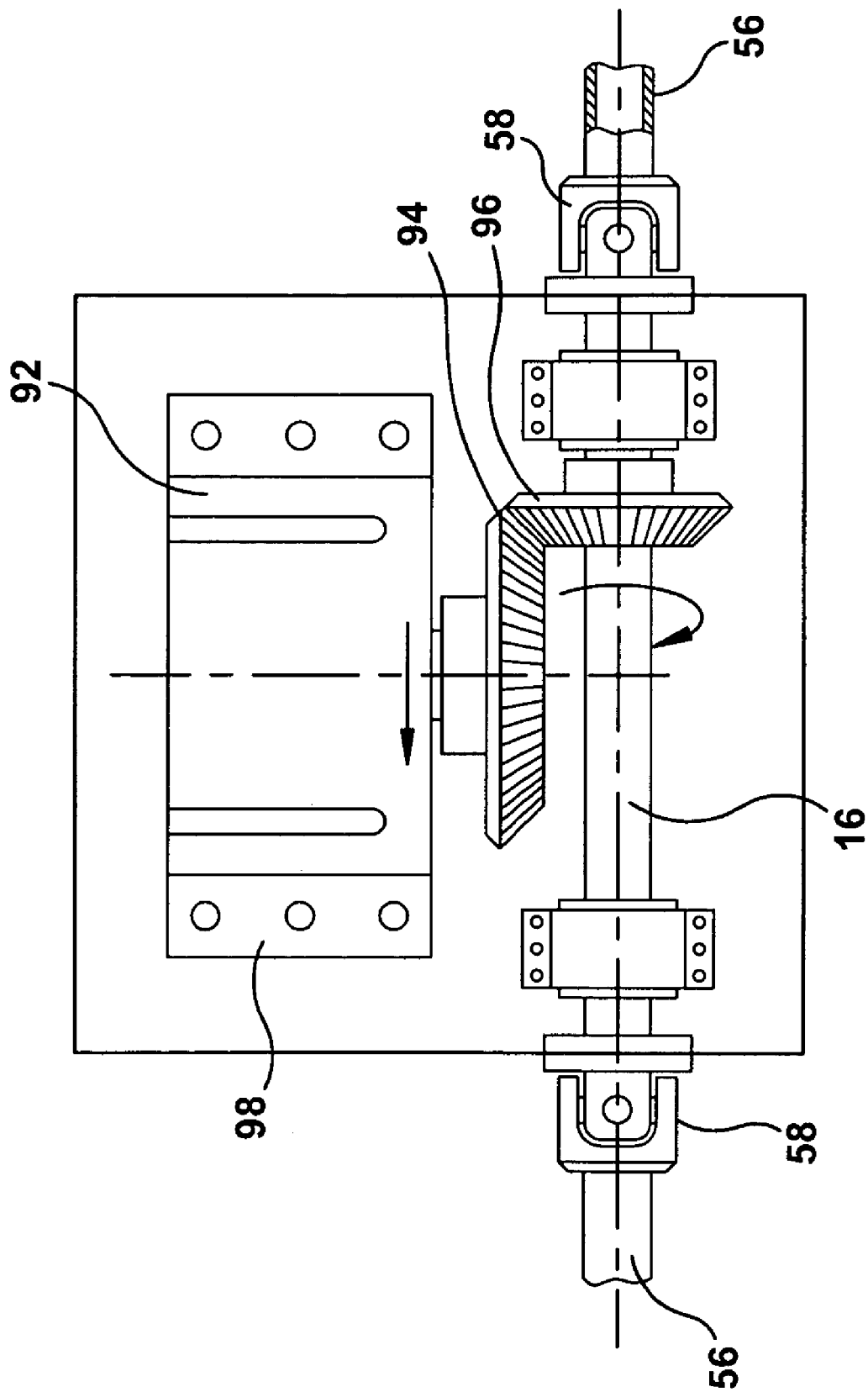
FIG. 9 is view of a ratchet assembly in accordance with the present invention.

Although the ratcheting mechanism 26 and 34 have been shown as coupled to the shaft 16, the ratcheting mechanisms may be arranged to engage the shaft 16 through a gear. Referring to FIG. 9, a ratcheting mechanism 92 is illustrated. The ratcheting mechanism 92 is not directly engaged with the shaft 16. The mechanism 92 is positioned above the shaft 16 and uses a pair of gears 94 and 96 to engage the shaft 16. Similarly as previously described, the ratcheting mechanism 92 transfers rotational motion from the pulley (located within the housing 98) to the shaft 16 when the pulley is rotated in a first direction, and does not transfer motion from the pulley to the shaft 16 when the pulley is rotated in a second direction. The arrangement illustrated in FIG. 9 allows for the removal of a damaged ratchet mechanism 92 and replacement of that mechanism 92 without shutting down the system to stop the rotation of the shaft 16.

Although the foregoing embodiments of the present invention have been directed to a plurality of motion translating assemblies 12 arranged to rotate a shaft 16 to drive a single generator 14, it will be readily understood by those skilled in the art that the present invention as described may be applied to any number of arrangements to transform vertical displacement of a buoy to mechanical or electrical energy. For example, each motion translating assembly 12 may be arranged to drive a shaft attached to a generator dedicated to that assembly 12. In another example, the energy of a wave may be harnessed to drive a pump to move hydraulic fluid to drive a generator.

Figure 10:
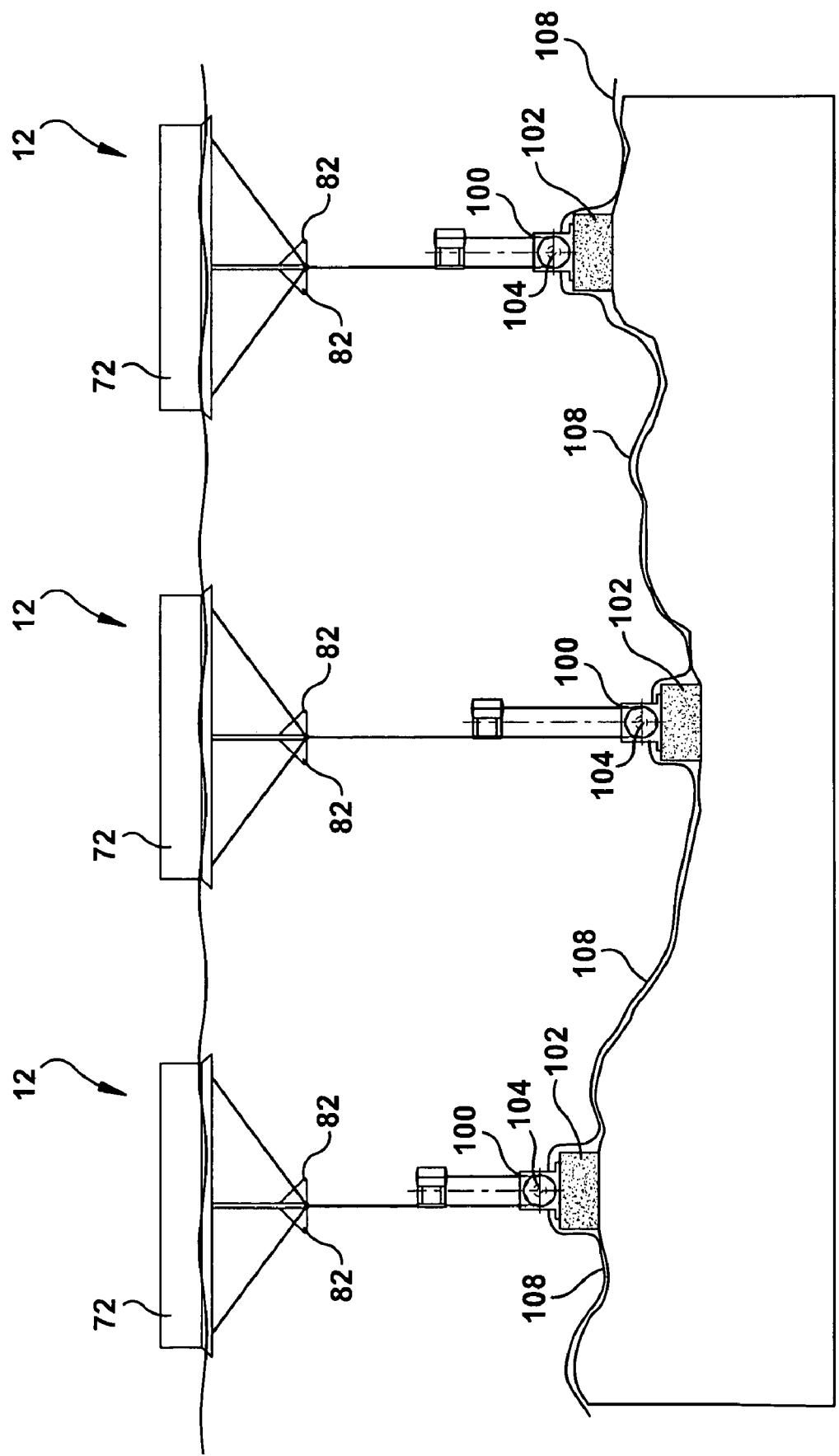
FIG. 10 is a view of another wave energy recovery system in accordance with the present invention.
Figure 11B:
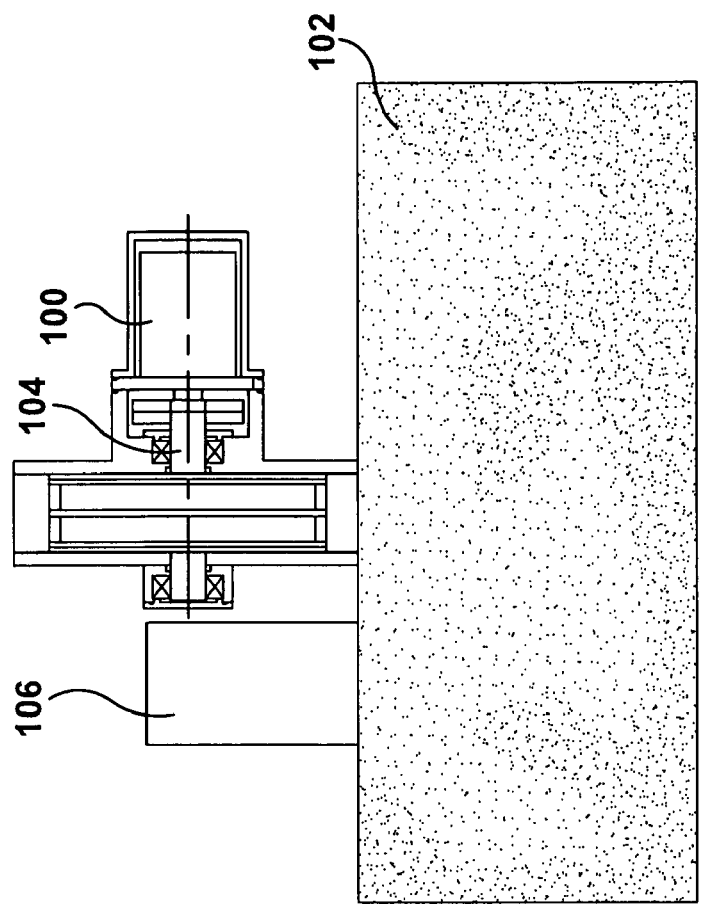
FIGS. 11A and 11B are detailed views of the wave energy recovery system of FIG. 10.
Figure 11A:
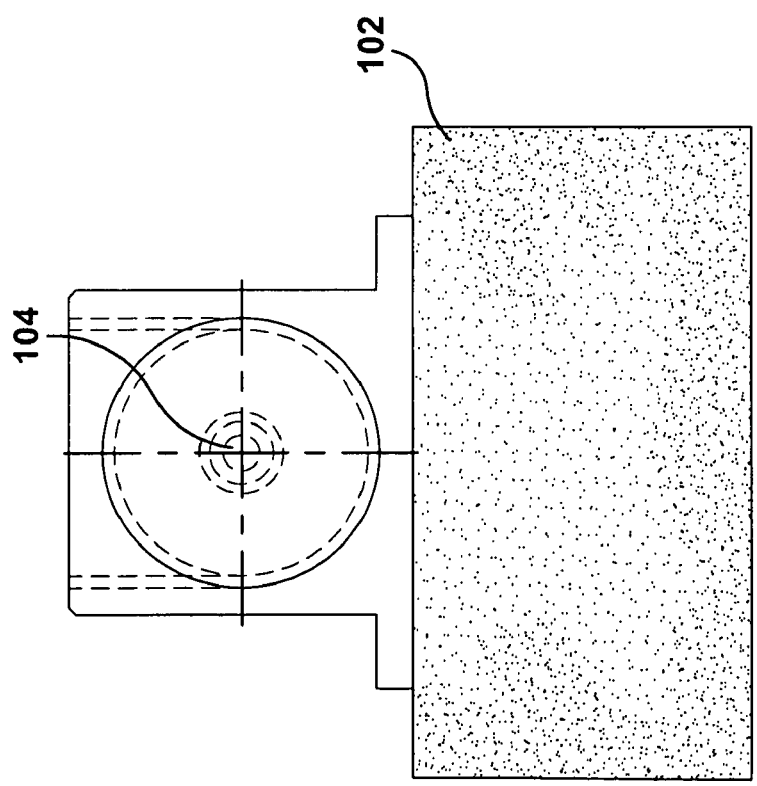

With reference to FIGS. 10, 11A, 11B, and 12, another embodiment of the present invention is illustrated. The motion translating assemblies 12 are arranged to drive dedicated generators 100 coupled to each support platform 102. The assemblies 12 are arranged as previously described. However, a permanent magnet generator 100 is attached to each support platform 102. The vertical motion of the main buoy 18 or 72 is translated to rotational motion to rotate a driveshaft 104. The driveshaft 104 is coupled to and drives the generator 100, which produces electric power. The generated electric power can be delivered to shore, either for immediate use or to feed into a power distribution grid. Optionally, the electric power can be stored on the support platform 102 to be subsequently delivered to shore. One method of storing the electric power on the support platform 102 is to couple the generator 100 to a supercapacitor 106. Supercapacitors offer relatively high cycle lives, having the capacity to cycle millions of times before failing; low impedance; rapid charging; and no lose of capability with overcharging. As illustrated in FIG. 10, a power cable 108 may be attached in series to each supercapacitor 106 to deliver stored electric power to shore. As a wave passes the motion translating assemblies 12, some assemblies produce electric power, while others are momentarily idle. Similar to the cooperation of assemblies 12 to rotate the shaft 16 previously described, the plurality of supercapacitors 106 placed in series cooperate to deliver a consistent current of electric power to shore. A programmable logic control device may optionally be incorporated into the system to control the generators 100, supercapacitors 106, and other system components to delivery a consistent electrical current to the shore.

Figure 12:
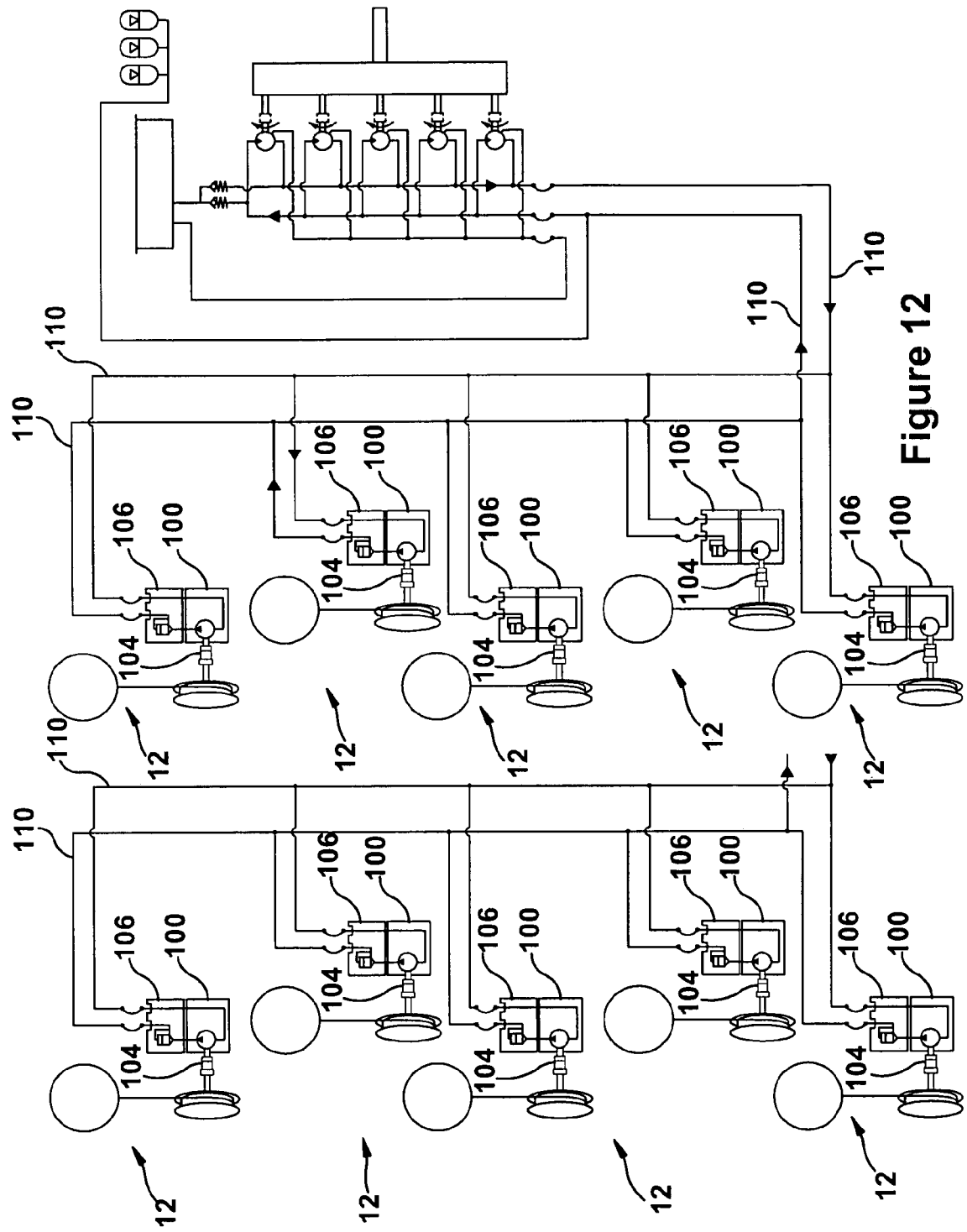
FIG. 12 is a schematic illustration of another embodiment of a wave energy recovery system in accordance with the present invention.

The driveshafts 104 may be arranged to only rotate in one direction as previously described, or may optionally be arranged to rotate in both clockwise and counterclockwise directions. An AC permanent magnet generator may be arranged to generate electric power regardless of the direction the driveshaft 104 rotates. Generators may also be arranged to eliminate any need for a gearbox when generating electric power. With reference to FIG. 12, a system may be optionally arranged such that each dedicated generator 100 has a dedicated power cable 110 to deliver electric power to shore. The electric power generated by the plurality of generators 100 may be accumulated on shore and delivered to a power distribution grid.

Figure 13:
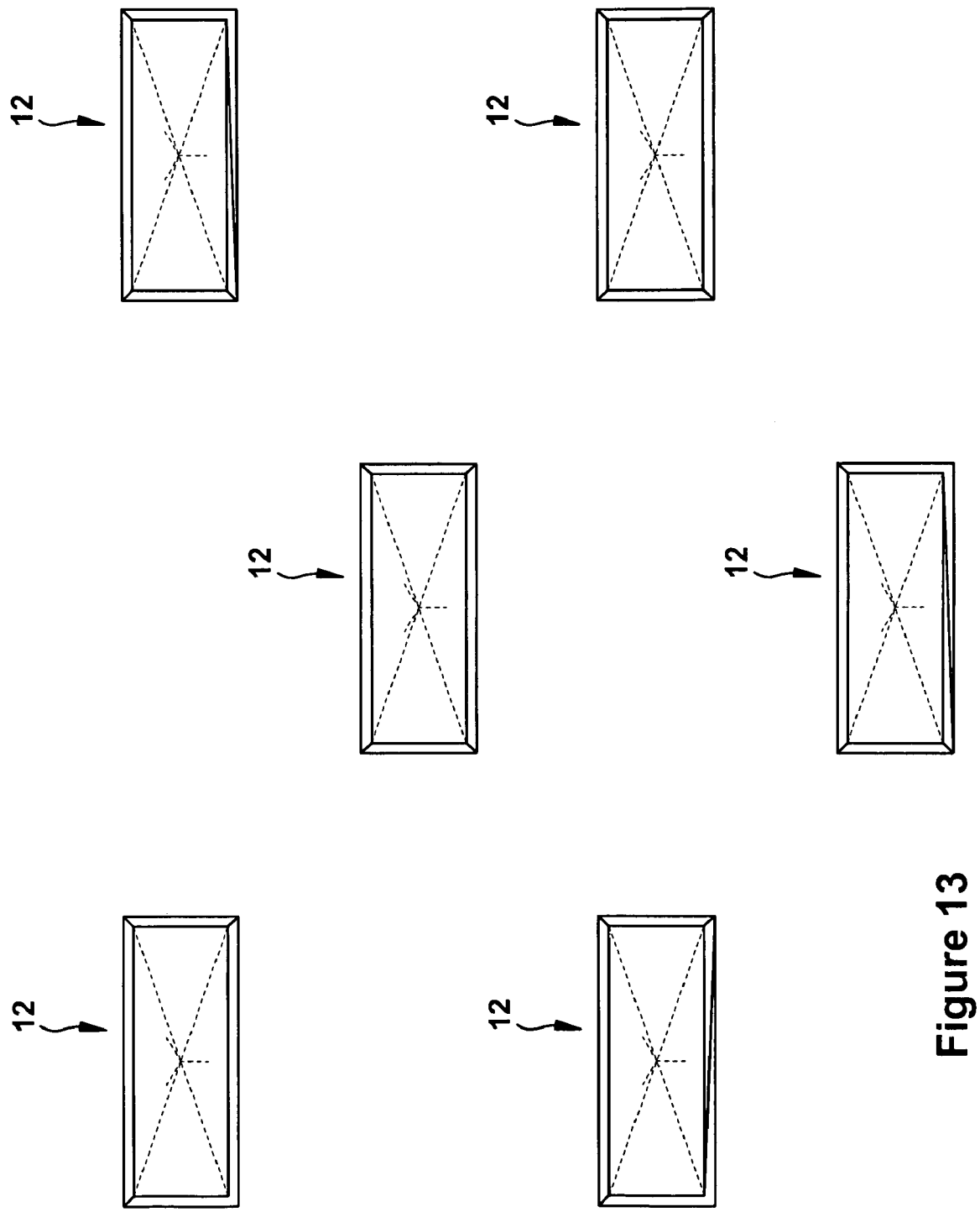
FIG. 13 is a schematic view of another wave energy recovery system of the present invention.

The use of dedicated generators 100 secured to each support platform 102 allows for easy installation of the wave energy recovery system. As illustrated in FIG. 13, support platforms 102 may be placed randomly, without concern for the positioning of adjacent platforms 102. Each motion translating assembly 12 and dedicated generator 100 is self-sufficient and does not rely on adjacent assemblies 12. Flexible power cables 108 or 110 allow a generator 100 or supercapacitor 106 to deliver electric power to shore from nearly any location on the seabed, either in series or in parallel.

Figure 14:
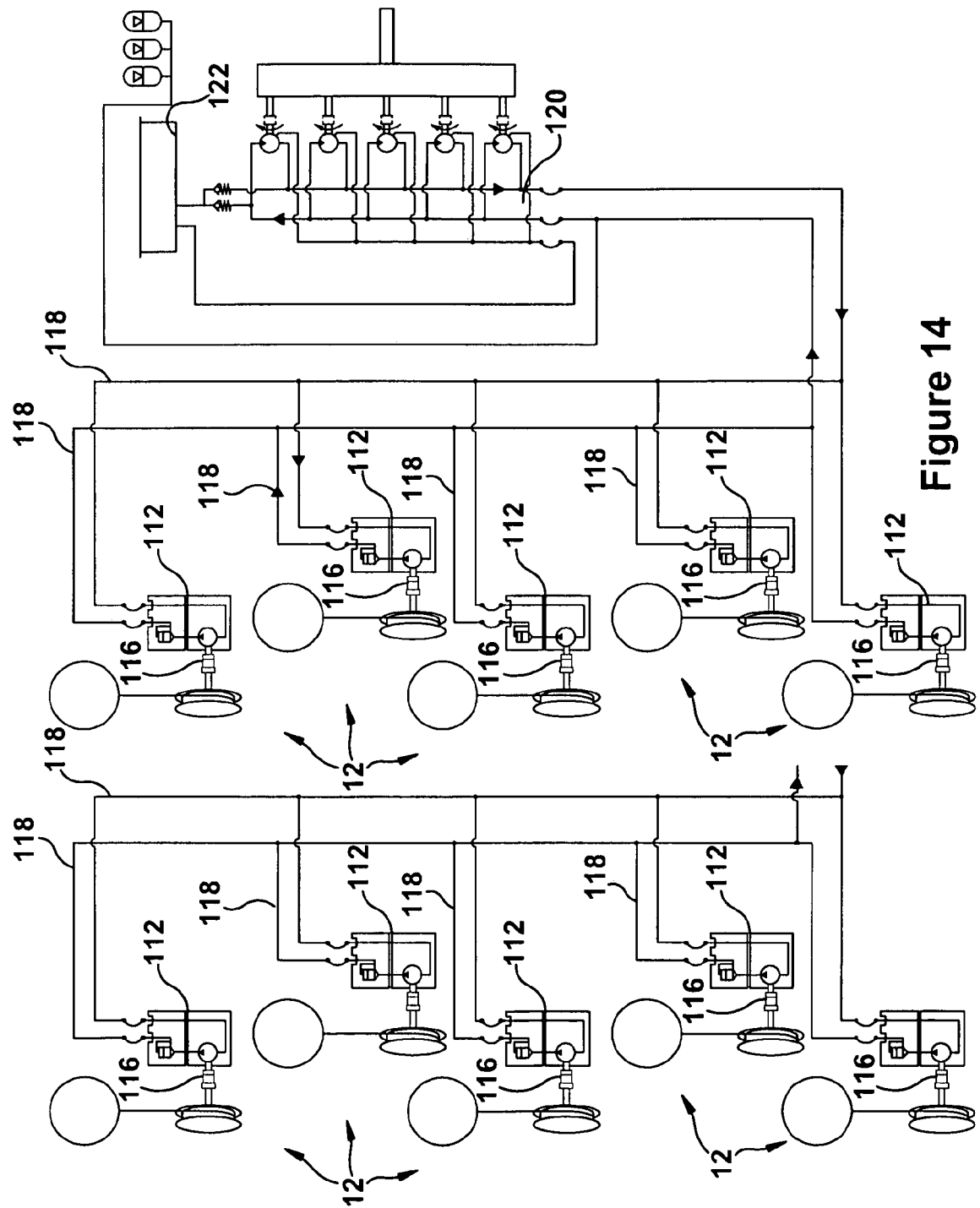
FIG. 14 is a schematic illustration of another embodiment of a wave energy recovery system in accordance with the present invention.
Figure 15B:
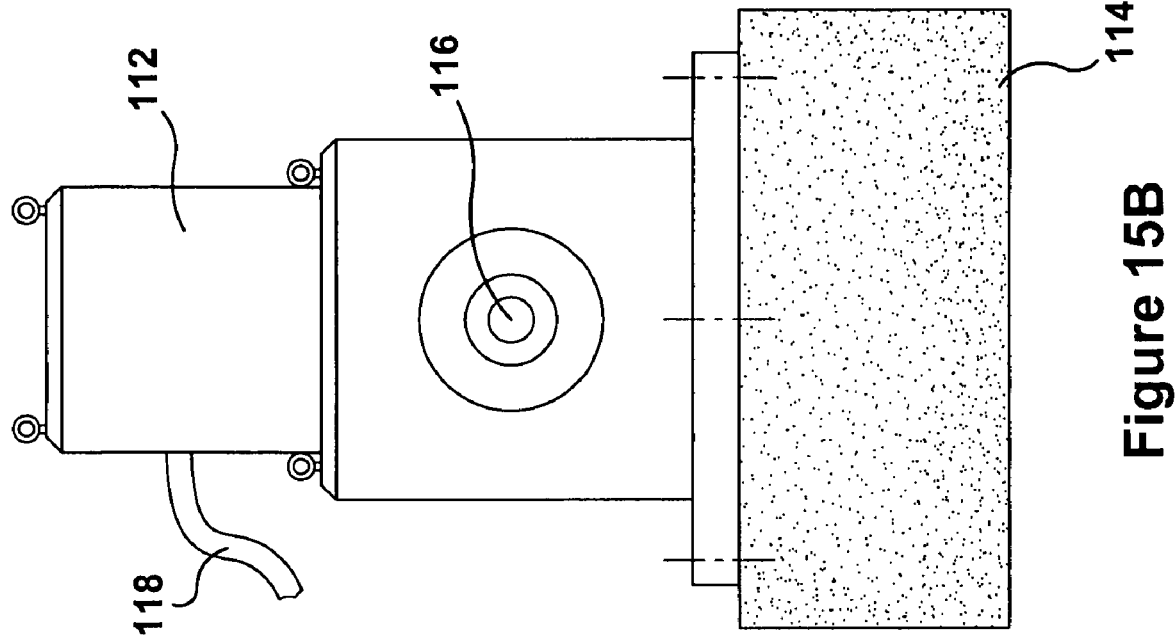
FIGS. 15A and 15B are detailed views of the wave energy recovery system of FIG. 14.
Figure 15A:
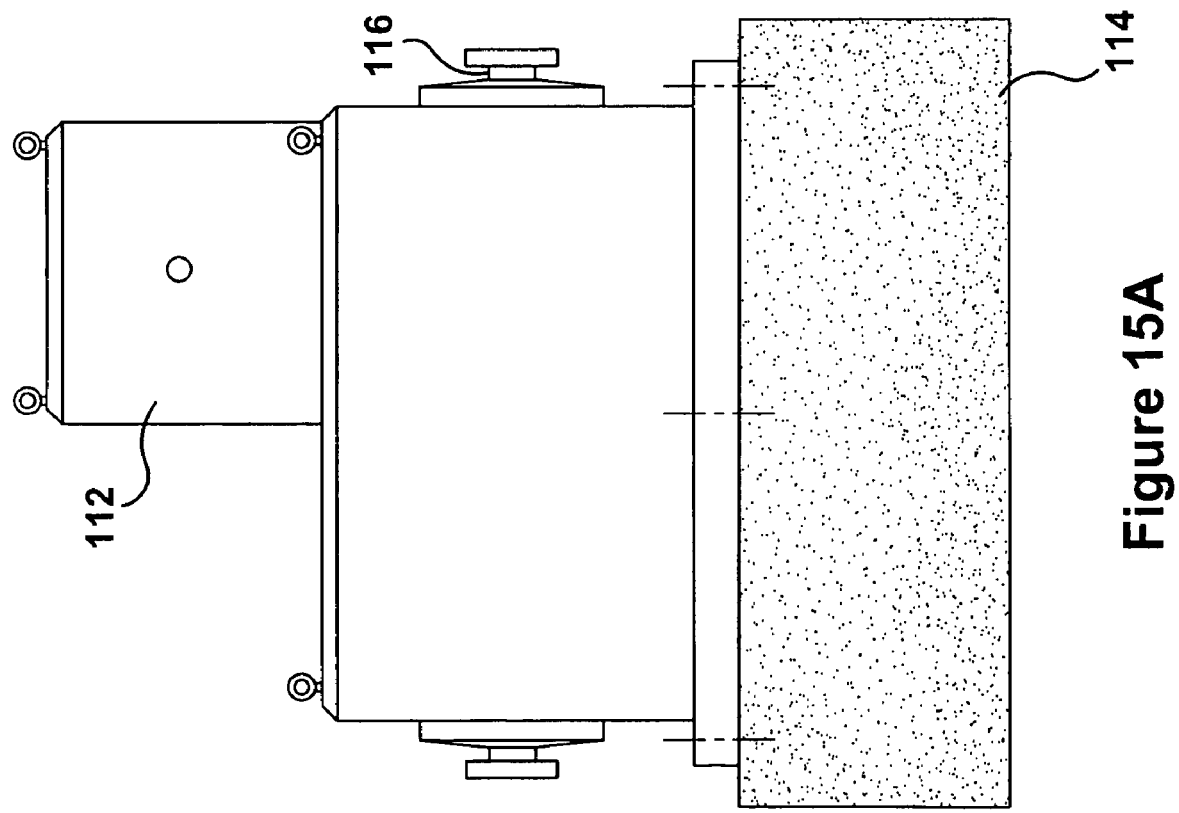

With reference to FIGS. 14, 15A, and 15B, yet another embodiment of the present invention is illustrated. The motion translating assemblies 12 are arranged such that each assembly 12 drives individual pumps 112 secured to each support platform 114. The assemblies 12 are arranged to rotate a driveshaft 116 coupled to each pump 112. Pressure lines 118 couple each pump 112 to a multiple hydraulic pump drive system 120, typically located on shore. Each pressure line 118 transmits pressure generated by each pump 112 to a central pressure repository or accumulator 122. This pressure repository 122 releases pressure at a constant rate to drive a flywheel of the multiple hydraulic pump drive system 120 to generate electric power. Such an arrangement results in self-sufficient assemblies 12 and pumps 112. It will be readily understood how the inclusion of flexible pressure lines 118 allows for easy installation, as described above. Similar to the previous description, the multiple hydraulic pump drive system 120 generates an AC current, which is converted to DC current by a rectifier. A voltage converter generates a consistent DC current to be used as a final source of electricity or to be converted back to AC current.

The embodiments, as described herein, allow for easy and inexpensive relocation of a wave energy recovery system. As will be readily understood, a system may be relatively easily and quickly disassembled and moved to a more desirable location. In addition, the modular nature of the embodiments allows for rapid expansion of an existing and operative system. In addition, the location of systems on a seabed provides for a self-cooling system, which improves operation and lowers maintenance costs.

The preferred embodiment of the invention is shown in the accompanying drawings. However, nothing in this disclosure or the drawings should be interpreted to limit the broadest scope of the invention as recited in the appended claims. And while the invention has been described with reference to the preferred embodiment, obviously other embodiments, modifications, and alternations clearly falling within the scope of the invention as claimed would be evident to a reader upon reading and understanding this specification and the accompanying drawings. To the extent covered by the appended claims, all such embodiments, modifications, and alterations are contemplated by the present disclosure.

Having thus described the invention, we claim:

1. A wave energy recovery system comprising:
    a motion translating assembly comprising;
        a main buoy;
        a cable connected at a first end to said main buoy;
        a retracting buoy connected to a second end of said cable, said retracting buoy including a guide sleeve movably connected to said cable;
        a shaft coupled to said main buoy, wherein vertical motion of said main buoy is translated into rotational motion of said shaft; and
    an electric power generating device coupled to said shaft, wherein rotational motion of said shaft results in said electric power generating device generating electric power.

2. The wave energy recovery system of claim 1, wherein said motion translating assembly further comprises:
    a pulley, coupled to said shaft; and
    wherein said cable, is wrapped around said pulley.

3. The wave energy recovery system of claim 2 wherein the coupling of said pulley to said shaft translates rotational motion from said pulley to said shaft when said pulley rotates in a first direction and does not translate motion from said pulley to said shaft when said pulley rotates in a second direction.

4. The wave energy recovery system of claim 3 wherein said motion translating assembly is one of a plurality of motion translating assemblies comprising said wave energy recovery system.

5. The wave energy recovery system of claim 1 wherein said shaft is comprised of a plurality of shaft segments.

6. The wave energy recovery system of claim 5 wherein each of said plurality of motion translating assemblies is coupled to an adjacent motion translating assembly by one of said plurality of shaft segments.

7. The wave energy recovery system of claim 6 wherein each of said plurality of shaft segments is coupled to one of said plurality of pulleys by a constant velocity joint.

8. The wave energy recovery system of claim 1 further comprising a support platform, wherein said shaft is rotatably coupled to said support platform.

9. The wave energy recovery system of claim 8 wherein said buoy is positioned proximate to a surface of a body of water and said support platform is positioned proximate to a bed of said body of water.

10. The wave energy recovery system of claim 1 wherein said electric power generating device is an alternating current permanent magnet generator.

11. The wave energy recovery system of claim 1 further comprising a gearbox, wherein said gearbox is coupled to said shaft and coupled to said electric power generating device.

12. The wave energy recovery system of claim 1 further comprising a capacitor coupled to said electric power generating device.

13. The wave energy recovery system of claim 1 wherein said main buoy comprises:
a water intake valve; and
an air intake valve.

14. The wave energy recovery system of claim 1 further comprising a power cable coupled to said electric power generating device.

15. The wave energy recovery system of claim 1 wherein said main buoy comprises:
a rectangular body; and
a skirt coupled to said rectangular body.

16. A wave energy recovery system comprising:
a motion translating assembly comprising;
a main buoy; and
a cable connected to a first end to said main buoy;
a retracting buoy connected to a second end of said cable, said retracting buoy including a guide sleeve movably connected to said cable;
a shaft coupled to said main buoy, wherein vertical motion of said main buoy is translated into rotational motion of said shaft;
a pump coupled to said shaft, wherein rotational motion of said shaft results in said pump generating pressure;
a pressure line coupled to said pump; and
an electric power generating device coupled to said pressure line.

17. The wave energy recovery system of claim 16, wherein said electric power generating device is a multiple hydraulic pump drive system.

18. The wave energy recovery system of claim 17 wherein said motion translating assembly is one of a plurality of motion translating assemblies comprising said wave energy recovery system.

19. The wave energy recovery system of claim 18 wherein said pump is one of a plurality of pumps comprising said wave energy recovery system;
further wherein, pressure from said plurality of pumps is accumulated to drive said hydraulic generator.

20. A method for recovering energy from waves comprising:
positioning a plurality of buoys in a body of water;
positioning a shaft in said body of water;
positioning an electric power generating device in said body of water or proximate to said body of water;
coupling each of said plurality of buoys to said shaft by way of a cable, wherein each of said buoys is connected to a first end a cable, and a retracting buoy is connected to a second end of said cable, said retracting buoy including a guide sleeve movably connected to said cable;
coupling said shaft to said electric power generating device;
translating vertical motion of said buoy to rotational motion of said shaft; and
engaging rotational motion of said shaft to said electric power generating device to generate electric power.

* * * * *